United States Patent [19]

Stauber

[11] Patent Number: 5,161,933
[45] Date of Patent: Nov. 10, 1992

[54] APPARATUS FOR HANDLING HEAVY LOADS

[75] Inventor: Hans-Ulrich Stauber, Grüt, Switzerland

[73] Assignee: SFT AG Spontanfördertechnik, Weinfelden, Switzerland

[21] Appl. No.: 776,697

[22] Filed: Oct. 16, 1990

Related U.S. Application Data

[63] Continuation of Ser. No. 616,997, Nov. 21, 1990, abandoned, which is a continuation-in-part of Ser. No. 308,024, Feb. 9, 1989, abandoned.

[30] Foreign Application Priority Data

Mar. 16, 1988 [CH] Switzerland ............... 00990/88

[51] Int. Cl.$^5$ ............................... B66B 9/20
[52] U.S. Cl. ..................... 414/608; 280/43.12
[58] Field of Search ................. 414/607–608, 414/910–911; 180/209; 280/43.12, 402; 108/51.1

[56] References Cited

U.S. PATENT DOCUMENTS

| | | | |
|---|---|---|---|
| 1,608,039 | 11/1926 | Romine | 108/51.1 |
| 1,879,214 | 9/1932 | Hallowell et al. | 108/51.1 |
| 2,738,222 | 3/1956 | Needham | 298/14 |
| 2,931,450 | 4/1960 | Bear | 180/14 |
| 3,423,101 | 1/1969 | Boeye | 280/46 |
| 3,581,923 | 6/1971 | Archer | 214/620 |
| 3,669,292 | 6/1972 | Tuura | 214/620 |
| 3,729,215 | 4/1973 | Paakkinen | 280/425 A |
| 3,963,257 | 6/1976 | Harron | 280/43.12 |
| 4,159,060 | 6/1979 | Buse | 414/608 |
| 4,801,238 | 1/1989 | Pezzolato | 280/43.12 |
| 4,884,936 | 12/1989 | Kawada | 280/43.12 |
| 4,904,147 | 2/1990 | Wasylyshyn | 414/608 |

FOREIGN PATENT DOCUMENTS

| | | | |
|---|---|---|---|
| 348814 | 9/1965 | Australia | 280/43.12 |
| 2909-532 | of 1980 | Fed. Rep. of Germany | |
| 319428 | of 1970 | Sweden | |
| 1296-452-A | of 1987 | U.S.S.R. | |
| 758223 | 10/1956 | United Kingdom | 414/608 |
| 1553-292 | of 1979 | United Kingdom | |

Primary Examiner—Jesûs D. Sotelo
Attorney, Agent, or Firm—Walter C. Farley

[57] ABSTRACT

A transportation apparatus for transporting heavy loads, particularly for transporting print product reels in the printing industry, has a frame (2) and at least one rigid axle or axle journal (6) with at least one wheel or roller (5). During transportation the apparatus is raised in such a way that only one horizontal transport load axle or one or more axle journal (6) located on an axial line exert an action. These axle journals (6) are arranged in a first area (17) of the outside of frame (2), the axial line being substantially at right angles to a line connecting the center of the frame to the first outside area. At least one lifting element (8) for supporting on the straddleforks (11) or forks of the vehicle (10) is, in a second area (18) of the outside of frame (2) facing the transport load axle, fixed to the frame. The straddleforks (11) of a transporation vehicle (10) are so introduced beneath the frame (2) of the transportation apparatus (1), that the axles of the support wheels (13) are at least approximately located on the axial line of the rollers or wheels (5) of the transport load axle or axle journal or are supported by the transportation apparatus.

10 Claims, 5 Drawing Sheets

APPARATUS FOR HANDLING HEAVY LOADS

CROSS REFERENCE TO RELATED APPLICATION

This is a continuation of U.S. Ser. No. 616,997 filed Nov. 21, 1990, now abandoned, which was a continuation in part of U.S. Ser. No. 308,024 filed Feb. 9, 1989, now abandoned.

This invention relates to a method and an apparatus for transporting and manipulating heavy loads, particularly print product reels using an industrial truck.

BACKGROUND OF THE INVENTION

Straddlefork lift trucks and other industrial trucks are widely used for transportation within manufacturing facilities as a result of their universal utilizability. As a result of the flexibility provided by such industrial trucks, they are required for use for all conceivable purposes. However, limits are placed on such vehicles due to limiting constructional conditions, e.g. the drive type, loading capacity, travelling or handling stability, etc. Thus, problems occur in connection with the travelling and handling stability particularly when transporting loads of 2 tons and more. Account has hitherto been taken of such problems by massive, expensive construction of the transportation vehicles, or alternatively special vehicles were developed. However, more robust construction leads to new problems, because such heavy vehicles, apart from the high manufacturing and operating costs, in turn are less manipulatable and steerable and therefore less flexible to use.

However, if heavy loads have to be transported by means of industrial trucks, use is also made of fork lift trucks with additional means for coupling to lorry trailers or the like. However, this concept suffers from the problem of the more difficult maneuverability of vehicles with three or more axles, so that the maneuverability often required in confined storage conditions cannot be achieved. Since, in addition, short loading and unloading times are required, it is undesired and prejudicial to fit an additional implement, which then has to be removed when using the industrial truck for other purposes.

SUMMARY OF THE INVENTION

An object of the present invention is to provide a method and a transportation apparatus which, using conventional industrial trucks and without the complication of additional means on the vehicle, permit the transportation and manipulation of heavy loads, provides high maneuverability for the vehicle, high stability during transportation and short loading and unloading times.

Briefly described, the invention includes a transportation apparatus for transporting heavy loads in combination with a fork lift truck of the type having a body, a single set of steerable wheels carrying the body, at least two elevatable forks extending from the body in a primary direction of motion of the truck along a supporting surface and wheel means rotatably mounted near the distal ends of the forks for supporting the forks on the supporting surface. The transportation apparatus comprises a frame including side members extending generally parallel with an intended direction of motion and first and second transverse end members adjacent opposite ends of the side members and means for supporting a load above the frame. First and second wheels are rotatably mounted at opposite sides of the frame adjacent the first transverse end member with substantially coaxial axes of rotation. The second transverse end member is spaced above the supporting surface a distance sufficient to permit insertion of the forks under the second transverse end member to a position in which the axes of rotation of the wheel means on the forks are substantially aligned with the coaxial axes of rotation of the first and second wheels, whereby when the forks are elevated, the end of the frame at the second transverse end member is lifted and the first and second wheels along with the wheel means remain in contact with the supporting surface, so that the frame and the load thereon are supported by the first and second wheels together with the wheel means and the steerable wheels carrying the body, all of the supporting wheels and wheel means being pivotable about no more than two longitudinally spaced rotation axes.

The transportation apparatus has at least one load axle with wheels or rollers. By suitable raising using straddleforks of a transportation vehicle, the apparatus is brought into a position in which the load rests on only the one transportation apparatus load axle, the other support of the load being provided by the vehicle. Because, according to the invention, the transportation vehicle cooperates with the transportation apparatus, it is possible to use conventional straddlefork lift trucks for the transportation of heavy loads. The load axle of the apparatus also carries part of the load so that, even in the case of very heavy printed product reels and other loads, normally dimensioned vehicles can be employed. As the force transmission to the straddleforks of the vehicle takes place in the vicinity of its chassis, the support wheels are not highly loaded, which keeps their resistance to rolling relatively low and is particularly advantageous in the case of ground unevenness.

Through being able to transport heavy loads with conventional straddlefork lift trucks, new possibilities are opened in the storage field, particularly under confined storage conditions.

BRIEF DESCRIPTION OF THE DRAWINGS

Embodiments of the invention are described in greater detail hereinafter relative to the drawings, wherein.

DESCRIPTION OF THE PREFERRED EMBODIMENTS

Conventional straddlefork lift trucks are particularly suitable as transportation vehicles since, because of their construction, they are suitable for transporting heavy loads. The long straddleforks also make it possible to use long transportation apparatuses, such as are required for print product reels, which typically have diameters of up to 2 and more meters. It is possible to use other industrial trucks in a corresponding manner.

Figure 1:
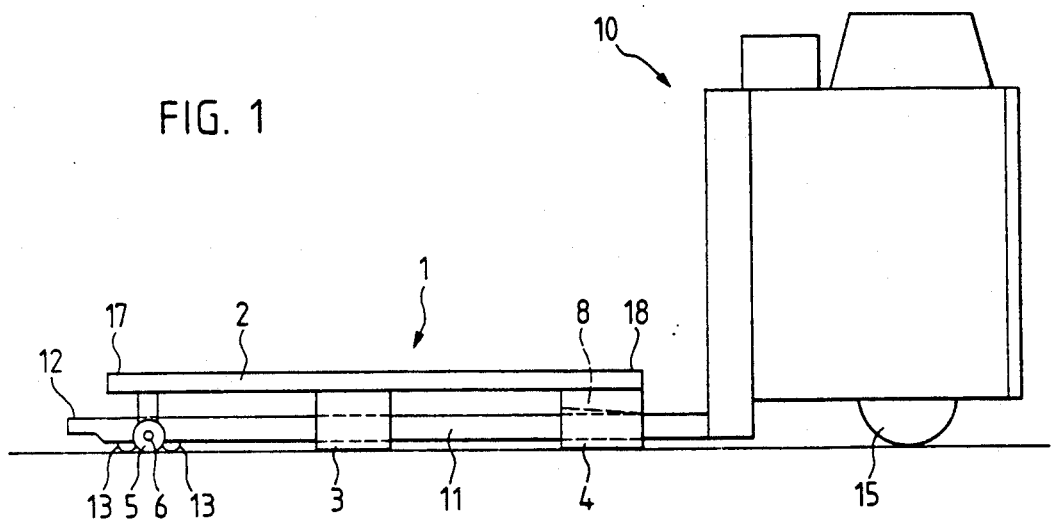
FIG. 1 is a side elevation of a pallet according to the invention with two load wheels mounted on axle journals shown in the inoperative position.

FIG. 1 shows a first, simple embodiment of the apparatus. The transportation apparatus is constructed as a pallet 1 and contains a platform 2 and two bearing elements 3, 4 fixed thereto and running parallel to the narrow ends (at right angles to the drawing plane). Two lateral rollers 5, of which only one is visible in this side view, are mounted in the vicinity of a first pallet narrow end 17, each on its own axle journal 6, located on a common axial line. The bearing elements 3, 4 are provided in the longitudinal direction with passages for the straddleforks 11. On a narrow end 18 of the pallet, opposite from the end having rollers 5, is provided at least one lifting element 8 under which can be passed the straddleforks 11 of the transportation vehicle 10. Transportation vehicle 10, preferably a commercially available straddlefork lift truck, is moved up to the pallet 1 from the right (as seen in FIG. 1) and the straddleforks 11 are placed under the pallet. When the free ends 12 of the straddleforks 11 are raised, then the lifting elements 8 engage on the straddleforks 11 and the narrow end 18 of the pallet 1 is raised. Preferably the straddleforks of the vehicle are guided by the bearing elements and/or lifting elements 8 and are coupled thereto by means of coupling elements (not shown in FIG. 1), so that pallet and vehicle form a rigid unit during transportation. In this embodiment the undersides of the lifting elements are slightly chamfered so that a very large bearing surface is obtained in the transportation position. In order not to restrict the maneuverability of this unit, the axles of support wheels 13 of the straddlefork lift truck must coincide with the axles 6 of the rollers 5 or must be located very close to axles 6. In order to ensure this proper relative positioning of vehicle and pallet, a stop member (not shown in FIGS. 1 or 2) can be provided on the pallet 1 and/or on the vehicle 10.

The principle of the invention is that the combination of industrial truck and transportation apparatus, when assembled in the transportation position, only has two effective axles (the axles of steerable wheels 15, as well as axle 6 and the axes of rotation of wheels 13, which are almost on a single axial line), the transportation apparatus 1 itself only being supported on one bearing axle (transportation load axle) during the transportation of loads. The invention makes every effort to ensure that there is problem-free maneuverability, even in the case of heavy loads, as a result of favorable weight distribution of the load being transported and corresponding construction of the transportation apparatus. For this purpose, on the one hand, the transportation apparatus must be appropriately designed and constructed and, on the other hand, the transportation vehicle and said apparatus must be reciprocally arranged and moved in accordance with the desired procedure. The stabilization of the transportation apparatus is taken over by the industrial truck or further bearing points (load points) are formed by the truck which simultaneously in a very simple manner leads to several advantages. As the inventive pallet apparatus only has a single transportation load axle, it is possible to pivot it without the corresponding wheels or rollers having to have an adjustment angle or without their having to be constructed as swivel rollers or casters. Basically such an apparatus can be compared with a wheelbarrow which, after raising by the handles, also has only a single load axle with a single wheel. The bearing point of the wheel here corresponds to the rotation or pivoting point. Even in the case of very heavy loading, frictional resistance which occurs is so small that problem-free pivoting is possible.

Figure 2:
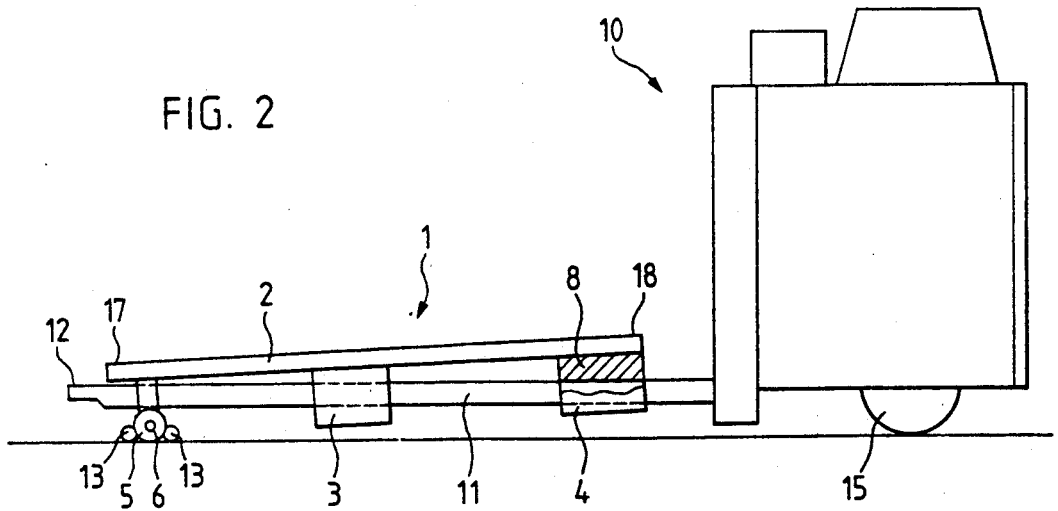
FIG. 2 is a side elevation of a pallet in accordance with the invention after raising the straddleforks of the transportation vehicle ready for transportation.

FIG. 2 shows that the weight of a raised pallet on its rollers 5 and on the support wheels 13, as well as via the bearing point of lifting elements 8, bears on the wheels 15 of the transportation vehicle 10. This leads to an optimum weight distribution and to high stability during transportation. On the one hand, a loaded pallet is raised on its outside, so that the force distribution generally leads to a relatively small necessary lifting force and, on the other hand, the bearing point of the pallet is located in the center between the two load axles, so that high stability is achieved. This is an important advantage compared with methods like those referred to hereinbefore, in which a fork lift truck is used for raising a trailer and consequently, in the case of heavy loads, high torque acts on the fork lift truck.

As can be readily gathered from FIGS. 1 and 2, raising of such a pallet for transportation requires a relatively high lift in order to obtain adequate ground clearance. Obviously, shortening of the bearing elements 3, 4 would lead to an improvement, but in the case of the conventional construction of the pallet from wood, this possibility is limited because of its loading capacity. Thus, according to the invention, preference is given to vertically adjustable rollers 5 on the transportation apparatus. For this purpose the rollers 5 are mounted on a support which is e.g. pivotable with respect to the frame in a vertical plane. Such an adjustment possibility simultaneously makes it possible to ensure that in the inoperative state the pallet does not rest on the rollers and, instead, the rollers are only activated when the straddleforks are introduced beneath the pallet. This is advantageous if the pallet is not only to be transported in accordance with the invention, but also if it must be moved over gravity conveyors. A sensor means can be provided to ensure that the rollers are automatically pivoted or lowered into the transportation position as soon as precise orientation of the transportation vehicle with its support wheels is achieved.

Figure 3A:
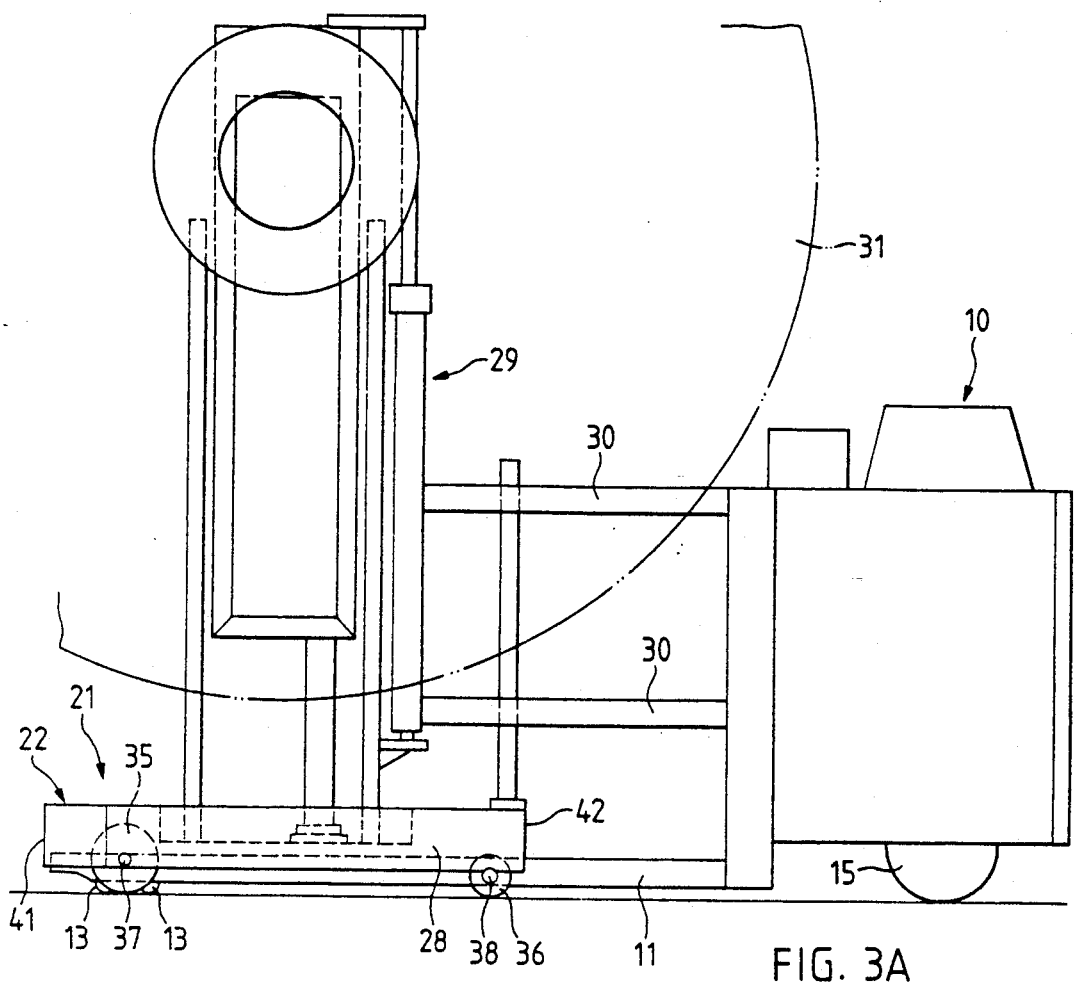
FIGS. 3A-3C are side elevation, top plan and front elevation views, respectively, of a transportation apparatus with four wheels and a holding or retaining device for print product reels.
Figure 3B:
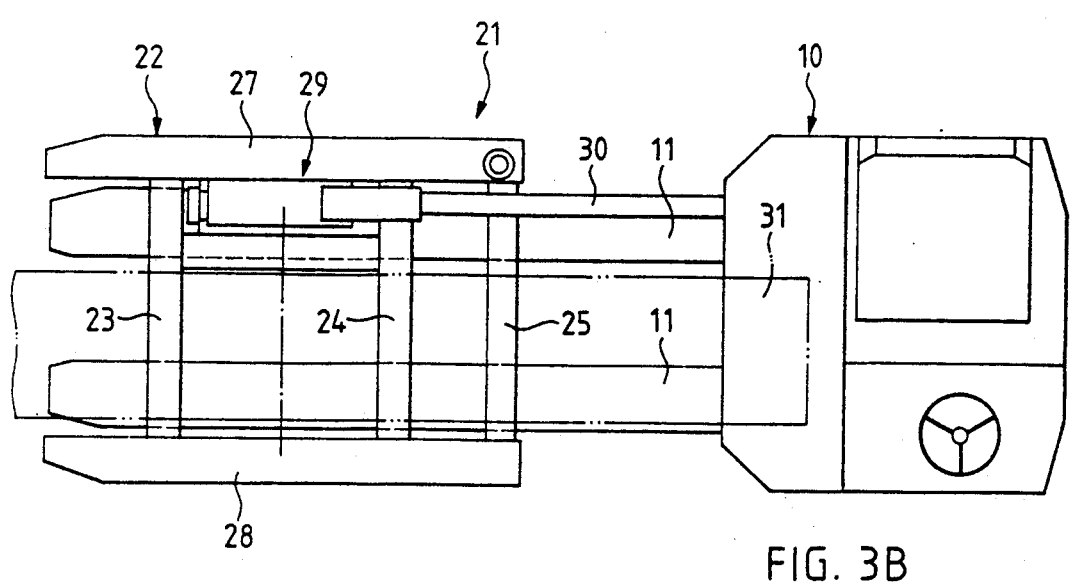
Figure 3C:
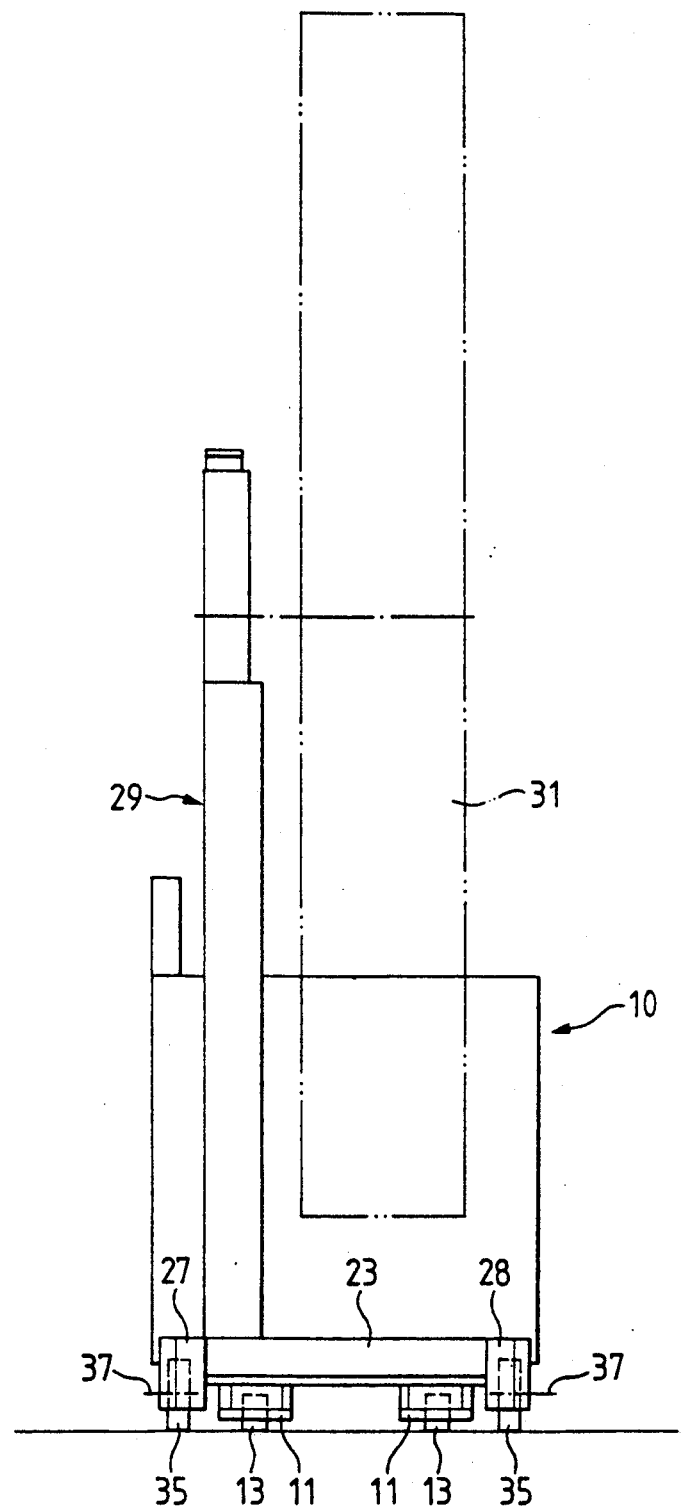

Another embodiment is shown in FIGS. 3A to 3C. For the transportation and handling of printed product reels, such as are nowadays obtained in the printing industry for intermediate storage purposes and the like, use is made of special equipment and a great variety of vehicle types. As the high-mounted, heavy reels cause handling problems both with respect to stability and their very considerable weight, conventional industrial trucks cannot, or can only to a limited extent, be used for this purpose. The use of the inventive apparatus makes it possible to transport such reels with standard straddlefork lift trucks. The transportation apparatus 21 has a frame 22 with longitudinal side strut members 27, 28 and transverse strut members 23-25. A conventional holding or retaining device 29 for print product reels 31 is installed in a known manner on frame 22. The transportation apparatus 21 (before being lifted) rides on four wheels 35, 36, which are mounted on two axles 37, 38 or four corresponding axle journals aligned on two longitudinally spaced axes. The straddleforks 11 of the straddlefork lift truck 10 are inserted beneath the transportation apparatus 21. By raising straddleforks 11, the end 42 of frame 22 closest to the vehicle is raised because the lifting element, which is in this case formed by transverse strut 25, is positioned lower than the other two transverse struts 23, 24. As can in particular be gathered from FIG. 3C, the support wheels 13 of the straddlefork lift truck are located between the two rollers 35 of the transportation apparatus, their axles only being slightly horizontally and vertically displaced with respect to the axles (or axis) 37. In order to avoid undesired displacement of the transportation apparatus, it is possible to provide a braking means (not shown) for one or more of the rollers 35 or 36 which is released as soon as the straddleforks have been raised into the transportation position, or by which the rollers are blocked as soon as the straddleforks are lowered. For stabilizing the retaining device 29 during transportation, it is also possible to provide support mean 30 on the straddlefork lift truck, which have no detrimental effect on operation during the normal use of the truck.

When transverse strut 25 is lifted by the forks, wheels 36 are lifted from the ground (or floor), leaving only wheels 13 and rollers 35 in contact with the ground at one end of frame 22 and steerable wheels 15 of the lift truck at the other end. Thus, the load is totally supported at one end by wheels 15 and at the other end by wheels 35, 13, the axes of rotation of which are substantially aligned. This allows wheels 15 to control the direction of movement of the coupled-together frame and truck with the other set of wheels pivoting about a single point between the wheels as described in the wheelbarrow analogy above.

Figure 4A:
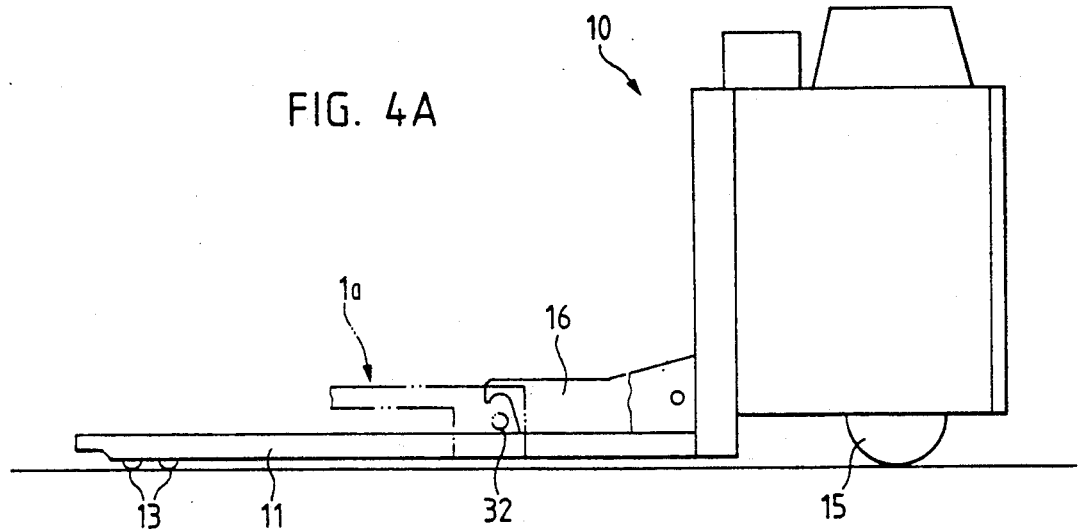
FIGS. 4A and 4B are side elevation and top plan views, respectively, of an apparatus for coupling a transportation apparatus to a straddlefork lift truck.
Figure 4B:
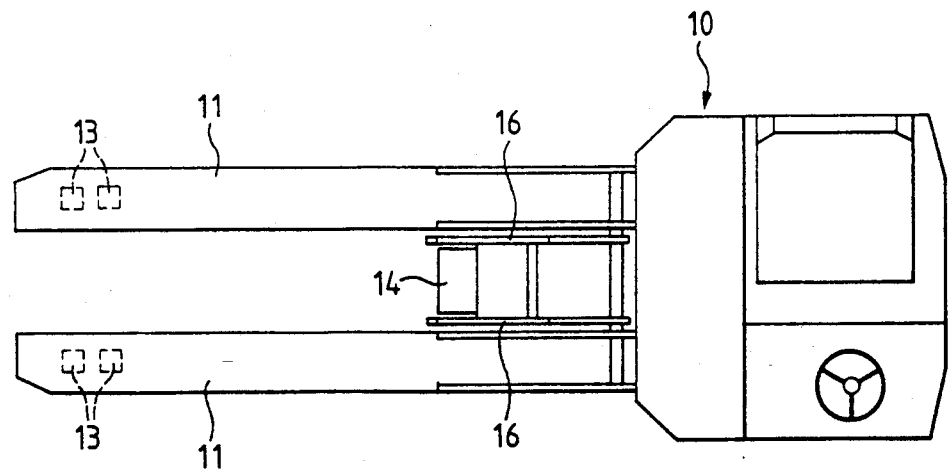

An embodiment of a locking mechanism is shown in FIGS. 4A and 4B. For this purpose the straddlefork lift truck 10 is provided between the straddleforks 11 with a pallet stop 14. Two gripping arms 16 are also fixed between the two straddleforks 11. It is also possible to increase the stability by providing additional gripping arms above or laterally of the straddleforks. As is diagrammatically shown in broken line form in FIG. 4A, the transportation pallet apparatus 1a has at its end closest to the vehicle, a transverse rod 32 or other coupling elements. These can also be formed by the transverse strut 25 described with reference to FIGS. 3A to 3C. The transportation vehicle is moved so that the straddleforks extend under the transportation pallet apparatus and the latter is made to abut with the pallet stop 14. By raising the transportation apparatus by means of the straddleforks 11, the transverse rod 32 engages with the hooked end of a gripping arm 16, so that the transportation apparatus is firmly coupled to vehicle 10 until it is lowered again after transportation. Through this firm coupling of the transportation apparatus with the vehicle, there is an increase in the tilting stability of the apparatus because the latter in this way has a common, low-lying center of gravity together with the vehicle.

Figure 5:
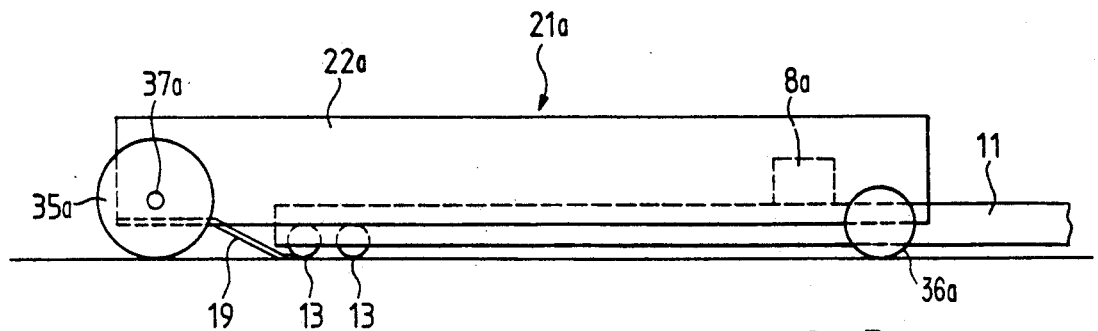
FIG. 5 is a schematic side elevation of an embodiment of a transportation apparatus with ramps for the support wheels.

Another embodiment of the invention is schematically shown in FIG. 5. In the hitherto described embodiments, the load on the transportation apparatus is simultaneously supported on the load rollers or wheels 5, 35 and on the support wheels 13 of the transportation vehicle, as well as on the vehicle wheels 15. As part of the load rests on the support wheels with the relatively small diameter thereof, it is a prerequisite that the ground or floor is relatively flat. However, if the latter has thresholds or other unevenness, it is advantageous to remove the load from the support wheels. According to FIG. 5 the transportation apparatus 21a is provided in the vicinity of the load axle 37a with at least one ramp 19 for the support wheels 13 of the two vehicle straddleforks 11. This ramp 19 is connected in a rigid or articulated manner to frame 22a. In order that the transportation apparatus does not roll away during the introduction of the straddleforks, preferably a wheel blocking means (not shown) is provided and this is only released when the straddleforks 11 have been completely inserted. A transverse strut 8a serves as the lifting element. In order to reduce friction, rollers can also be fitted to the underside of strut 8a. As can readily be gathered, the transportation apparatus is raised on its right-hand side (as seen in FIG. 5) when the support wheels 13 are moved up the ramp 19. The raising of the apparatus is accompanied by that of the ramp 19 and, if necessary, the ramp can be additionally pivoted upwards. The entire weight rests on the load wheels 35a and the not shown vehicle wheels, so that axles and wheels must be correspondingly dimensioned. The large diameter of wheels 35a makes it possible to use the apparatus even when there is pronounced ground or floor unevenness. In the same way this transportation apparatus can also be used in conjunction with a fork lift truck.

Figure 6:
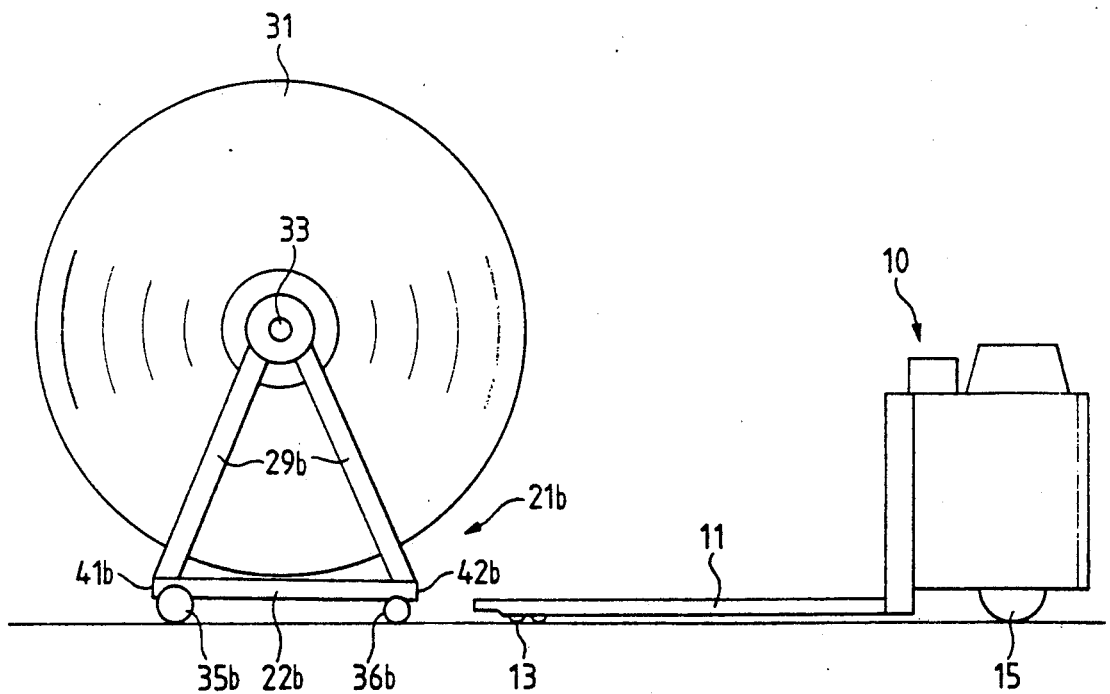
FIG. 6 is a side elevation of an embodiment of the apparatus with a transportation mounting support for two print product reels.

FIG. 6 shows an embodiment of the apparatus for the transportation of two print product reels. The favorable weight distribution between the transportation apparatus and the vehicle makes it possible to move this relatively high overall weight in accordance with the inventive method. The transportation apparatus 21b has a frame 22b and four lateral wheels 35b, 36b. A transportation vehicle 10 is ready for the introduction of the straddleforks 11 under the apparatus. A retaining device 29b for the reel 31 is supported in each case in the vicinity of the center of the ends 41b, 42b which are at right angles to the transportation direction. The retaining device 29b is laterally provided with two mounting supports 33, on each of which is secured a reel. The two reels are positioned behind one another with respect to the drawing plane. It is consequently possible to simultaneously move by means of the transportation apparatus two reels 31 which are in a vertical position (their axes are horizontal) and parallel to one another. As can also be gathered from the drawing, this construction leads to very good travelling stability. The total weight of the transportation apparatus and load rests on the four wheels 35b, 36b in the arrangement shown. If the transportation vehicle is now brought into the transportation position, i.e. with the straddleforks placed so far under the transportation apparatus 21b that the support wheels are located in the vicinity of wheels 35b and then the straddleforks 11 are raised, then part of the total weight rests on the forks. If, as in the present case, the center of gravity of the load is located roughly in the center of the transportation apparatus, approximately half the total weight is supported on the straddleforks. The closer the bearing point to the driving wheels 15 of vehicle 10, the smaller the load which must be supported by the support wheels 13. Preferably, the longitudinal sides of frame 22b are so long that, in the case of the inventive orientation of the support wheel axles and transportation load axle, the lifting element or bearing point is located on the straddleforks 11 in the vicinity of the center between the support wheels 13 and the driving wheels 15 or closer to the latter, the dimensions of commercial straddlefork lift trucks being used as a basis. As can be clearly gathered on closer consideration, during transportation the support wheels 13 carry about ¼ of the total weight. This relatively small load compared with conventional transportation possibilities offers the advantage that there is only a limited resistance to rolling of the support wheels and, through the loading of the driving wheels, the latter have greater traction. As the transportation apparatus 21 is only slightly wider than the spacing between the two straddleforks 11, it is possible to travel along very narrow passageways in stores and warehouses and print product reels can be handled on either side of the apparatus.

The invention is obviously not limited to the described embodiments-and in accordance with the inventive concept it is possible to use all apparatus which during transportation have, together with the vehicle, a two-axle character, i.e. either only a single axle of the transportation apparatus and a single axle of the vehicle, or a second or third axle of the vehicle (support wheel axles) are loaded. In the latter case, these additional axles must coincide at least approximately with the axle line of the loaded axle of the transportation apparatus. It is obvious that there can be considerable variations to the arrangement of the bearing elements and the wheels or rollers. It is particularly important that the two-axle character is retained and several wheels or rollers can be located on one or approximately on one, axial line. In the embodiment according to FIGS. 3A to 3C there are e.g. six rollers 13, 35 at one axle and two wheels 15 at the other.

A further embodiment contains a lifting element, which is vertically adjustable. For this purpose a simple hydraulic lifting device is provided, so that on increasing the lift of this lifting element the transportation apparatus frame is raised at this point with respect to the straddleforks of the transportation vehicle. This lifting element preferably simultaneously forms an arresting device with respect to the straddleforks 11 in that adjusting bores or depressions are provided in the straddleforks. This measure also in no way impairs the use of the straddlefork lift truck for other purposes.

What is claimed is:

1. A transportation apparatus for transporting heavy loads in combination with a straddlefork lift truck having a body, a single set of steerable wheels carrying said body, at least two elevatable forks extending from said body in a primary direction of motion of the truck along a supporting surface and wheel means rotatably mounted near the distal ends of said forks for supporting said forks on said supporting surface, said transportation apparatus comprising a generally rectangular frame including longitudinal side members and first and second transverse end members adjacent opposite ends of said side members;

means for supporting a load above said frame;

first and second wheels;

means for rotatably mounting said first and second wheels at opposite sides of said frame adjacent said first transverse end member with substantially coaxial axes of rotation; and said second transverse end member being spaced above the supporting surface a distance sufficient to permit insertion of said forks under said second transverse end member to a position in which the axes of rotation of said wheel means on said forks are so much closer to said coaxial axes of rotation of said first and second wheels than either of said axes of rotation are to said steerable wheels of said truck that said axes of rotation of said wheels and wheel means function as a single rotation axis, whereby when said forks are elevated, said end of said frame at said second transverse end member is lifted and said first and second wheels and said wheel means remain in contact with said supporting surface, so that said frame and the load thereon are supported at one end by said first and second wheels and said wheel means and at the other end by the steerable wheels carrying said body so that all of said supporting wheels and wheel means being pivotable about no more than two longitudinally spaced rotation axes.

2. An apparatus according to claim 1 and further comprising third and fourth wheels rotatably mounted at opposite sides of said frame adjacent said second transverse end member; and wherein said second transverse end member is mounted farther from said supporting surface than said first transverse end member.

3. An apparatus according to claim 1 and further comprising first and second substantially parallelepipedic lifting elements attached to said frame at said second transverse member.

4. An apparatus according to claim 3 wherein the distance between the axes of rotation of said first and second wheels and the closest part of said lifting elements is at least as great as one-half the distance between said wheel means on said forks and said single set of steerable wheels on said truck.

5. An apparatus according to claim 3 wherein the distance between the axes of rotation of said first and second wheels and said second transverse end member is at least as great as one-half the distance between said wheel means on said forks and said single set of steerable wheels on said truck.

6. An apparatus according to claim 1 wherein said frame further comprises retaining means for supporting a printed product reel.

7. An apparatus according to claim 6 wherein said retaining means further comprises first and second lateral mounting supports for concurrently supporting two printed product reels, said mounting supports being positioned at substantially the center of said frame.

8. An apparatus according to claim 1 and further comprising locking means on said truck for engaging a member attached to said frame for detachably locking said transportation apparatus to said truck.

9. An apparatus according to claim 1 and further comprising a ramp attached to said frame adjacent said first transverse member for receiving said support wheels.

10. An apparatus according to claim 1, wherein said means for supporting a load above said frame includes a support structure extending vertically upwardly from said transportation apparatus and means on said support structure for holding a paper-carrying reel over said frame so that the center of gravity of said reel is over the center of said frame.

* * * * *